US010422461B2

(12) United States Patent
Mitchell (10) Patent No.: US 10,422,461 B2
(45) Date of Patent: Sep. 24, 2019

(54) SLEEVE ACTUATED WIDE-RANGE COUPLING

(71) Applicant: Mueller International, LLC, Atlanta, GA (US)

(72) Inventor: Timothy J. Mitchell, Hixson, TN (US)

(73) Assignee: Mueller International, LLC, Atlanta, GA (US)

( * ) Notice: Subject to any disclaimer, the term of this patent is extended or adjusted under 35 U.S.C. 154(b) by 158 days.

(21) Appl. No.: 15/682,901

(22) Filed: Aug. 22, 2017

(65) Prior Publication Data

US 2019/0063657 A1 Feb. 28, 2019

(51) Int. Cl.
| *F16L 37/18* | (2006.01) |
| *F16L 21/00* | (2006.01) |
| *F16L 21/02* | (2006.01) |
| *F16L 37/10* | (2006.01) |

(52) U.S. Cl.
CPC ............. *F16L 37/18* (2013.01); *F16L 21/007* (2013.01); *F16L 21/02* (2013.01); *F16L 37/101* (2013.01); *Y10T 29/49826* (2015.01)

(58) Field of Classification Search
CPC ......... F16L 37/18; F16L 37/101; F16L 37/20; F16L 21/007; F16L 21/02; Y10T 29/49826
USPC .............................. 285/82, 85, 110, 308, 312
See application file for complete search history.

(56) References Cited

U.S. PATENT DOCUMENTS

| 4,938,511 A * | 7/1990 | Kersting ................... 285/312 |
| 5,005,876 A * | 4/1991 | Fahl ...................... F16L 37/20 285/312 X |
| 5,324,083 A * | 6/1994 | Vogelsang ................ 285/110 |
| 5,930,872 A * | 8/1999 | McBride |
| 2013/0106095 A1* | 5/2013 | Chen ..................... F16L 37/18 285/85 |

OTHER PUBLICATIONS

US Pipe; Brochure for 3"-64" Tyton Joint Pipe, 2016 edition, 19 pgs.

* cited by examiner

*Primary Examiner* — Zachary T Dragicevich
(74) *Attorney, Agent, or Firm* — Taylor English Duma LLP (57) ABSTRACT

A wide-range coupling includes a body, the body defining a first body end and a second body end, a body bore defined extending through the body from the first body end to the second body end, the body bore defining an axis; a gasket positioned within the body bore; a sleeve positioned at least partially within the body bore proximate to the first body end; and a sleeve actuator attached to the body, the sleeve actuator mechanically engaging the sleeve, the sleeve actuator configured to axially translate the sleeve relative to the axis of the body bore about and between a disengaged position and an engaged position.

14 Claims, 11 Drawing Sheets

SLEEVE ACTUATED WIDE-RANGE COUPLING

TECHNICAL FIELD

This disclosure relates to pipe couplings. More specifically, this disclosure relates to a pipe coupling for use with a wide range of pipe diameters.

BACKGROUND

Pipe couplings are commonly used to connect two pipe lengths together to form a pipe connection assembly, such as when installing a pipe system or pipe infrastructure. Some pipe couplings can be time consuming or difficult to install. For example, some stab-in couplings require a pipe length to be stabbed into a socket. A gasket can be disposed within the socket, and the pipe length must be stabbed through a gasket opening of the gasket to complete the joint. Large diameter pipe lengths can be difficult and heavy to maneuver, and a force required to stab the pipe length through the gasket opening can be very high in order to form a strong seal between the pipe length and the gasket. Consequently, equipment such as pulleys, chain blocks, or heavy machinery are often utilized to force the pipe length through the gasket opening.

Some other pipe couplings require tightening of numerous bolts positioned around the pipe coupling. The bolts typically must be tightened in a pattern, such as a star pattern, to ensure that pressure from the bolts is evenly distributed over the pipe connection assembly to provide for a reliable and uniform seal. Uneven tightening of the bolts can cause a poor seal and leaking of the pipe connection assembly. Limited access, such as when installing a pipe connection assembly in a trench, can also make it difficult to access each of the individual bolts for tightening.

Additionally, many pipe couplings and gaskets of the pipe couplings can only accommodate a narrow range of pipe sizes. For example, a pipe coupling or gasket manufactured to American Society of Mechanical Engineers (ASME) standards may not be compatible with a pipe length manufactured to Japanese Industrial Standards (JIS). A 6" nominal pipe length manufactured to JIS can define an outside diameter of 165.2 mm while a 6" nominal pipe length manufactured to ASME standards can define an outside diameter of 168.3 mm. Many common pipe couplings and gaskets cannot tolerate the range of outside diameters between standards, nominal pipe sizes, excessive manufacturing tolerance, or ovality of the pipe lengths without developing leaks or failing to seal.

SUMMARY

It is to be understood that this summary is not an extensive overview of the disclosure. This summary is exemplary and not restrictive, and it is intended to neither identify key or critical elements of the disclosure nor delineate the scope thereof. The sole purpose of this summary is to explain and exemplify certain concepts of the disclosure as an introduction to the following complete and extensive detailed description.

Disclosed is a wide-range coupling comprising a body, the body defining a first body end and a second body end, a body bore defined extending through the body from the first body end to the second body end, the body bore defining an axis; a gasket positioned within the body bore; a sleeve positioned at least partially within the body bore proximate to the first body end; and a sleeve actuator attached to the body, the sleeve actuator mechanically engaging the sleeve, the sleeve actuator configured to axially translate the sleeve relative to the axis of the body bore about and between a disengaged position and an engaged position.

Also disclosed is a pipe connection assembly comprising a wide-range coupling, the wide-range coupling comprising a body, the body defining a first body end, a body bore defined extending from the first body end into the body, the body bore defining an axis; a gasket positioned within the body bore; a sleeve positioned at least partially within the body bore proximate to the first body end, the sleeve being axially movable relative to the body, the sleeve defining a sleeve bore, the sleeve bore being coaxial to the axis; and a sleeve actuator attached to the body, the sleeve actuator mechanically engaging the sleeve, the sleeve actuator configured to axially translate the sleeve relative to the axis of the body bore about and between a disengaged position and an engaged position; and a pipe length defining a first pipe end and a second pipe end, the first pipe end extending through the sleeve bore and into the body bore.

Also disclosed is a method of connecting a pipe length to a wide-range coupling, the method comprising inserting a first pipe end of the pipe length into a body bore through a sleeve bore defined by a sleeve, the wide-range coupling comprising the sleeve and a body, the body defining the body bore, the sleeve positioned at least partially in the body bore, the body bore defining an axis, an end of the sleeve extending through a gasket opening defined by a gasket of the wide-range coupling; axially translating the sleeve along the axis in an engagement direction relative to the body and withdrawing the sleeve from the gasket opening; and engaging the gasket with an outer pipe surface of the pipe length to form a seal.

Various implementations described in the present disclosure may include additional systems, methods, features, and advantages, which may not necessarily be expressly disclosed herein but will be apparent to one of ordinary skill in the art upon examination of the following detailed description and accompanying drawings. It is intended that all such systems, methods, features, and advantages be included within the present disclosure and protected by the accompanying claims. The features and advantages of such implementations may be realized and obtained by means of the systems, methods, features particularly pointed out in the appended claims. These and other features will become more fully apparent from the following description and appended claims, or may be learned by the practice of such exemplary implementations as set forth hereinafter.

BRIEF DESCRIPTION OF THE DRAWINGS

The features and components of the following figures are illustrated to emphasize the general principles of the present disclosure. The drawings are not necessarily drawn to scale. Corresponding features and components throughout the figures may be designated by matching reference characters for the sake of consistency and clarity.

DETAILED DESCRIPTION

The present disclosure can be understood more readily by reference to the following detailed description, examples, drawings, and claims, and the previous and following description. However, before the present devices, systems, and/or methods are disclosed and described, it is to be understood that this disclosure is not limited to the specific devices, systems, and/or methods disclosed unless otherwise specified, and, as such, can, of course, vary. It is also to be understood that the terminology used herein is for the purpose of describing particular aspects only and is not intended to be limiting.

The following description is provided as an enabling teaching of the present devices, systems, and/or methods in its best, currently known aspect. To this end, those skilled in the relevant art will recognize and appreciate that many changes can be made to the various aspects of the present devices, systems, and/or methods described herein, while still obtaining the beneficial results of the present disclosure. It will also be apparent that some of the desired benefits of the present disclosure can be obtained by selecting some of the features of the present disclosure without utilizing other features. Accordingly, those who work in the art will recognize that many modifications and adaptations to the present disclosure are possible and can even be desirable in certain circumstances and are a part of the present disclosure. Thus, the following description is provided as illustrative of the principles of the present disclosure and not in limitation thereof.

As used throughout, the singular forms "a," "an" and "the" include plural referents unless the context clearly dictates otherwise. Thus, for example, reference to "an element" can include two or more such elements unless the context indicates otherwise.

Ranges can be expressed herein as from "about" one particular value, and/or to "about" another particular value. When such a range is expressed, another aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint.

For purposes of the current disclosure, a material property or dimension measuring about X or substantially X on a particular measurement scale measures within a range between X plus an industry-standard upper tolerance for the specified measurement and X minus an industry-standard lower tolerance for the specified measurement. Because tolerances can vary between different materials, processes and between different models, the tolerance for a particular measurement of a particular component can fall within a range of tolerances.

As used herein, the terms "optional" or "optionally" mean that the subsequently described event or circumstance can or cannot occur, and that the description includes instances where said event or circumstance occurs and instances where it does not.

The word "or" as used herein means any one member of a particular list and also includes any combination of members of that list. Further, one should note that conditional language, such as, among others, "can," "could," "might," or "may," unless specifically stated otherwise, or otherwise understood within the context as used, is generally intended to convey that certain aspects include, while other aspects do not include, certain features, elements and/or steps. Thus, such conditional language is not generally intended to imply that features, elements and/or steps are in any way required for one or more particular aspects or that one or more particular aspects necessarily include logic for deciding, with or without user input or prompting, whether these features, elements and/or steps are included or are to be performed in any particular aspect.

Disclosed are components that can be used to perform the disclosed methods and systems. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and systems. This applies to all aspects of this application including, but not limited to, steps in disclosed methods. Thus, if there are a variety of additional steps that can be performed it is understood that each of these additional steps can be performed with any specific aspect or combination of aspects of the disclosed methods.

Disclosed is a wide-range coupling and associated methods, systems, devices, and various apparatus. The wide-range coupling can comprise a body, a first sleeve, a second sleeve, a first sleeve actuator, and a second sleeve actuator. It would be understood by one of skill in the art that the disclosed wide-range coupling is described in but a few exemplary embodiments among many. No particular terminology or description should be considered limiting on the disclosure or the scope of any claims issuing therefrom.

Figure 1:
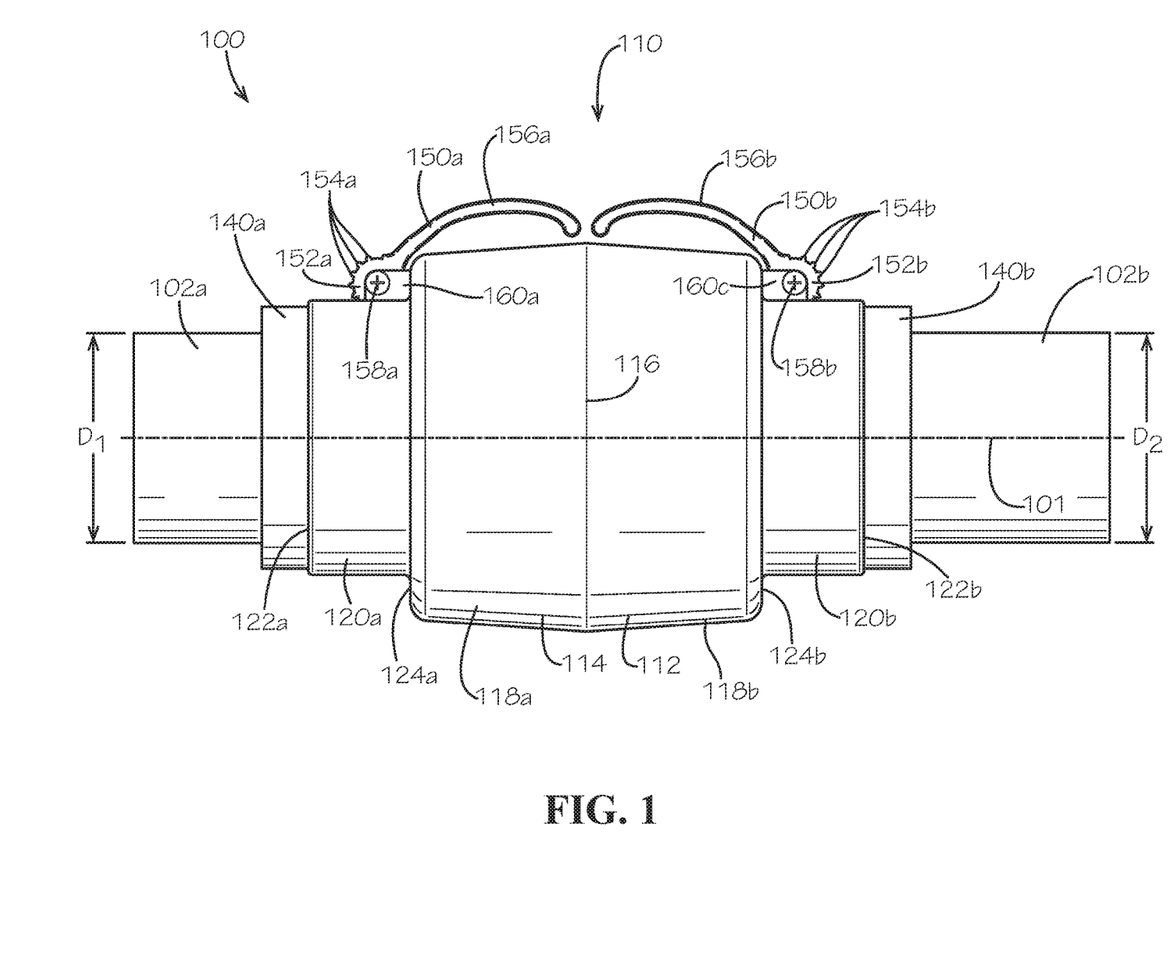
FIG. 1 is a side view of a pipe connection assembly in accordance with one aspect of the present disclosure comprising a first pipe length, a second pipe length, and a wide-range coupling.

FIG. 1 shows a side view of a pipe connection assembly 100 which can comprise a first pipe length 102a, a second pipe length 102b, and a wide-range coupling 110. The pipe lengths 102a,b are shown as short lengths for exemplary purposes; however, the pipe lengths 102a,b can be longer or shorter, and a length of each of the pipe lengths 102a,b should not be viewed as limiting. The first pipe length 102a can define a first outer pipe diameter $D_1$, and the second pipe length 102b can define a second outer pipe diameter $D_2$. The wide-range coupling 110 can be compatible with a range of pipe diameters, and the wide-range coupling 110 can connect two pipe lengths 102a,b of different pipe diameters or of the same pipe diameter. In the aspect of FIGS. 1-3, 4C, and 4D, the pipe lengths 102a,b are both shown sized to a minimum compatible pipe diameter. In the aspect of FIG. 5, the pipe lengths 102a,b can be sized to a maximum compatible pipe diameter.

The wide-range coupling 110 can comprise a body 112, a first sleeve 140a, a second sleeve 140b, a first sleeve actuator 150a, and a second sleeve actuator 150b. The body 112 can define a first body end 122a and a second body end 122b. The first body end 122a can be disposed opposite from the second body end 122b, and the body 112 can define an axis 101 extending from the first body end 122a to the second body end 122b. Unless otherwise stated, all descriptions of radial and axial directions as used herein are relative to the axis 101. The body 112 can define a first neck 120a disposed proximate to the first body end 122a, a second neck 120b disposed proximate to the second body end 122b, and a center portion 114 disposed between the first neck 120a and the second neck 120b. The body 112 can define a first shoulder 124a between the center portion 114 and the first neck 120a and a second shoulder 124b between the center portion and the second neck 120b. Each of the shoulders 124a,b can extend substantially radially inward from the body 112 to the adjacent neck 120a,b with respect to the axis 101.

In the present aspect, the center portion 114 can define a centerline 116 extending circumferentially around the center portion 114 at a midpoint defined between the first body end 122a and the second body end 122b. The centerline 116 can divide the center portion 114 into a first half 118a and a second half 118b. The first half 118a can be defined between the centerline 116 and the first shoulder 124a, and in the present aspect, the first half 118a can taper radially inward with respect to the axis 101 from the centerline 116 towards the first shoulder 124a. The second half 118b can be defined between the centerline 116 and the second shoulder 124b, and in the present aspect, the second half 118b can taper radially inward with respect to the axis 101 from the centerline 116 towards the second shoulder 124b. In other aspects, the halves 118a,b may not be tapered.

The sleeves 140a,b can extend into the body 112 through the first body end 122a of the first neck 120a and the second body end 122b of the second neck 120b, respectively. The sleeves 140a,b can fit closely within the respective necks 120a,b, and the sleeves 140a,b can be configured to axially translate, or telescope, inwards and outwards within the respective necks 120a,b with respect to the axis 101.

The sleeve actuators 150a,b can be attached to the body 112 by fasteners 158a,b respectively. The fastener 158a can extend through the first sleeve actuator 150a and through a pair of first ears 160a,b (first ear 160b shown in FIG. 3) to secure the first sleeve actuator 150a between the first ears 160a,b. The second sleeve actuator 150b can be attached to the body 112 by the fastener 158b. The fastener 158b can extend through the second sleeve actuator 150b and through a pair of second ears 160c,d (second ear 160d shown in FIG. 3) to secure the second sleeve actuator 150b between the second ears 160c,d. In the present aspect, the ears 160a,b,c,d can extend between the respective shoulders 124a,b of the body 112 and the respective neck 120a,b of the body 112.

Each sleeve actuator 150a,b can be configured to rotate around the respective fastener 158a,b relative to the body 112. Each sleeve actuator 150a,b can respectively define a gear portion 152a,b and a lever portion 156a,b. The lever portions 156a,b can extend outwards from the respective gear portions 152a,b.

In the present aspect, the sleeve actuators 150a,b and the sleeves 140a,b can be in an engaged position. With the sleeve actuators 150a,b in the engaged position, the lever portions 156a,b can extend axially inwards towards the centerline 116 relative to the axis 101. Each gear portion 152a,b can respectively define a plurality of teeth 154a,b. In the present aspect, the teeth 154a,b can be arranged circumferentially around the respective gear portion 152a,b. The teeth 154a,b of the respective sleeve actuators 150a,b can be configured to mechanically engage the adjacent sleeve 140a,b so that a position of the sleeve actuator 150a,b can control a position of the adjacent sleeve 140a,b.

Figure 2:
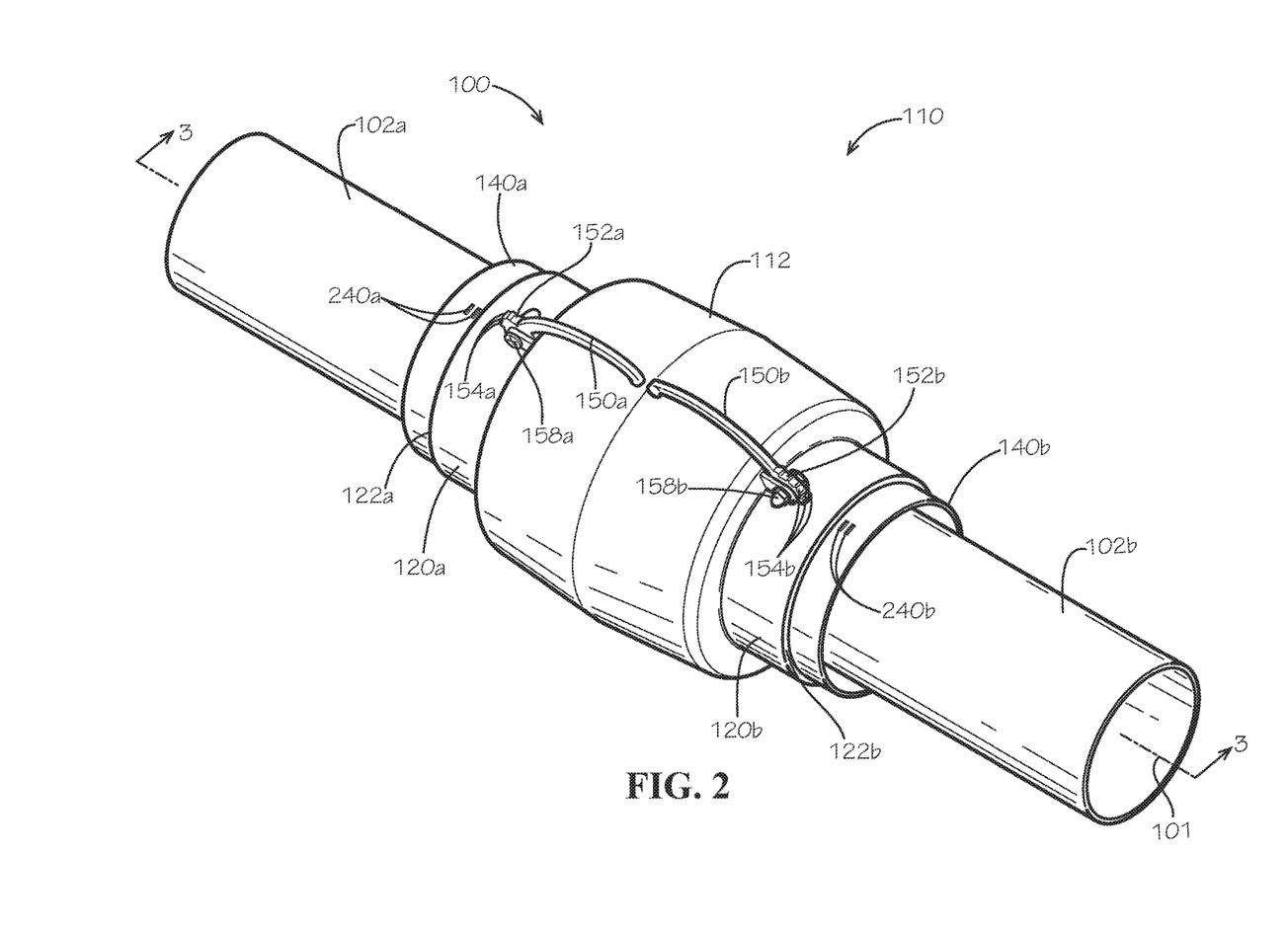
FIG. 2 is a perspective view of the pipe connection assembly of FIG. 1.

FIG. 2 is a perspective view of the pipe connection assembly 100 of FIG. 1. Each sleeve 140a,b can respectively define a plurality of slots 240a,b positioned in an axial arrangement relative to the axis 101. In the present aspect, each of the slots 240a,b can extend through the respective sleeve 140a,b; however in other aspects, the slots 240a,b can be defined into the respective sleeve 140a,b but may not extend through the respective sleeve 140a,b. In still other aspects, each sleeve 140a,b can respectively define raised teeth instead of slots 240a,b. Each of the slots 240a,b can be shaped and sized to receive a one of the respective teeth 154a,b. Through mechanical engagement between the teeth 154a,b and the respective slots 240a,b, rotation of each sleeve actuator 150a,b can cause axial translation of the adjacent sleeve 140a,b along the axis 101, as further discussed with respect to FIGS. 4A-D below.

Figure 3:
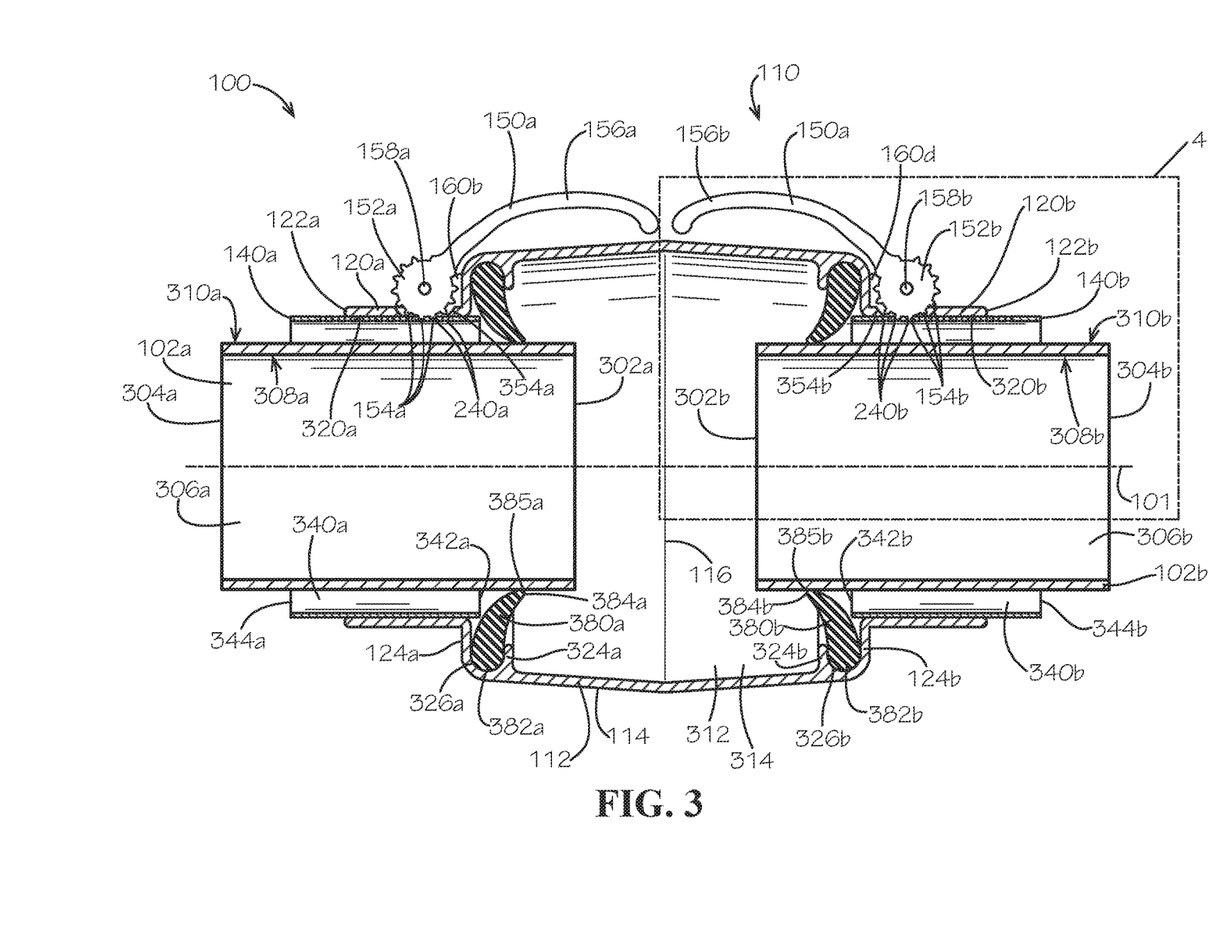
FIG. 3 is a cross-sectional view of the pipe connection assembly of FIG. 1 with a first sleeve actuator, a second sleeve actuator, a first sleeve, and a second sleeve of the wide-range coupling in an engaged position taken along line 3-3 shown in FIG. 2.

FIG. 3 is a cross-sectional view of the pipe connection assembly 100 of FIG. 1 taken along line 3-3 shown in FIG. 2. The body 112 can define a body bore 312 extending through the body 112 from the first body end 122a to the second body end 122b. The body bore 312 can define the axis 101. The wide-range coupling 110 can comprise a pair of gaskets 380a,b disposed within the body bore 312. Each gasket 380a,b can define an annular, or ring, shape, and each gasket 380a,b can extend circumferentially around the body bore 312. Each gasket 380a,b can define a radially outer lip 382a,b and a radially inner lip 384a,b, respectively. In the present aspect, each gasket 380a,b can taper from the radially outer lip 382a,b towards the radially inner lip 384a,b. The radially inner lip 384a,b can define a gasket opening 385a,b extending axially through the respective gasket 380a,b. In the present aspect, the gasket openings 385a,b can be substantially circular in shape.

The body 112 can define a pair of inner circumferential ribs 324a,b extending into the body bore 312 proximate to the respective shoulders 124a,b. A gasket groove 326a can be defined between the first shoulder 124a and the inner circumferential rib 324a, and a gasket groove 326b can be defined between the second shoulder 124b and the inner circumferential rib 324b. The radially outer lip 382a,b of each gasket 380a,b can be seated in the respective gasket groove 326a,b. The gaskets grooves 326a,b and the inner circumferential ribs 324a,b can retain the gaskets 380a,b within the body bore 312.

The body bore 312 can define a first neck bore portion 320a extending through the first neck 120a from the first body end 122a to the first shoulder 124a, a center bore portion 314 extending through the center portion 114 of the body 112 between the inner circumferential ribs 324a,b, and a second neck bore portion 320b extending through the second neck 120b from the second shoulder 124b to the second body end 122b. The gasket grooves 326a,b can be defined between the respective neck bore portions 320a,b and the center bore portion 314. The first neck bore portion 320a, the second neck bore portion 320b, and the center bore portion 314 can each be coaxial to the axis 101.

The sleeves 140a,b can extend through the respective neck bore portions 320a,b, and the sleeves 140a,b can be sized and shaped to closely fit within the neck bores 320a,b of the respective necks 120a,b to prevent misalignment and binding between the sleeves 140a,b and the necks 120a,b. In some aspects, the neck bores 320a,b can be lined with a material demonstrating a low friction coefficient, such as bronze or polytetrafluoroethylene ("PTFE"), for example and without limitation. In some aspects, the sleeves 140a,b can be coated with or can comprise a material demonstrating a low friction coefficient, such as bronze or PTFE for example and without limitation. Each neck 120a,b can define a gear port 354a,b, respectively, which can extend through the neck 120a,b. The teeth 154a,b of the respective sleeve actuators 150a,b can extend through the adjacent gear port 354a,b to engage the slots 240a,b of the respective sleeves 140a,b.

Each sleeve 140a,b can define a first sleeve end 342a,b and a second sleeve end 344a,b, respectively. The first sleeve end 342a,b of each sleeve 140a,b can be disposed opposite from the respective second sleeve end 344a,b. A sleeve bore 340a,b can be defined extending through the respective sleeve 140a,b from the first sleeve end 342a,b to the respective second sleeve end 344a,b. Each sleeve 140a,b can be positioned at least partially in the body bore 312. In some aspects, the sleeves 140a,b can be fully enclosed within the body bore 312.

Each pipe lengths 102a,b can define a first pipe end 302a,b and a second pipe end 304a,b, respectively. The first pipe end 302a,b of each respective pipe length 102a,b can be disposed opposite from the second pipe end 304a,b of the respective pipe length 102a,b. Each pipe length 102a,b can define an inner pipe surface 308a,b and an outer pipe surface 310a,b, respectively. The inner pipe surfaces 308a,b can each define a pipe bore 306a,b extending through the respective pipe length 102a,b from the first pipe end 302a,b to the second pipe end 304a,b, respectively. Each pipe length 102a,b can extend through the sleeve bore 340a,b of the respective sleeve 140a,b, and the first pipe ends 302a,b can extend into the center bore portion 314 of the body bore 312.

With the sleeve actuators 150a,b and the sleeves 140a,b in the engaged position, the radially inner lips 384a,b of the respective gaskets 380a,b can engage the outer pipe surface 310a,b of the respective pipe lengths 102a,b to form a seal. With the gaskets 380a,b sealed to the respective pipe lengths 102a,b, the pipe bores 306a,b can be connected in fluid communication with the center bore portion 314 of the body bore 312. When sealed with the pipe lengths 102a,b, the gaskets 380a,b can also isolate the neck bore portions 320a,b of the adjacent necks 120a,b from the center bore portion 314 of the body bore 312, thereby preventing leakage of fluids to the atmosphere.

FIGS. 4A-D show detail cross-sectional views of the second sleeve actuator 150b of the pipe connection assembly 100 of FIG. 1 in various stages of use. FIGS. 4A-D demonstrate a method for connecting the second pipe length 102b to the wide-range coupling 110 to form the pipe connection assembly 100. In the present aspect, the second pipe length 102b can be connected to the wide-range coupling 110 without using any tools or requiring tightening of any fasteners, such as bolts, studs, screws, or any other fasteners. The second sleeve actuator 150b, the second neck 120b, and the second sleeve 140b can be representative of both the sleeve actuators 150a,b, the necks 120a,b, and both of the sleeves 140a,b, and elements are referred to in generality in reference to FIGS. 4A-D. For example, the second neck 120b is simply referred to as "the neck 120b", and the second neck 120b can be representative of the first neck 120a as well.

Figure 4A:
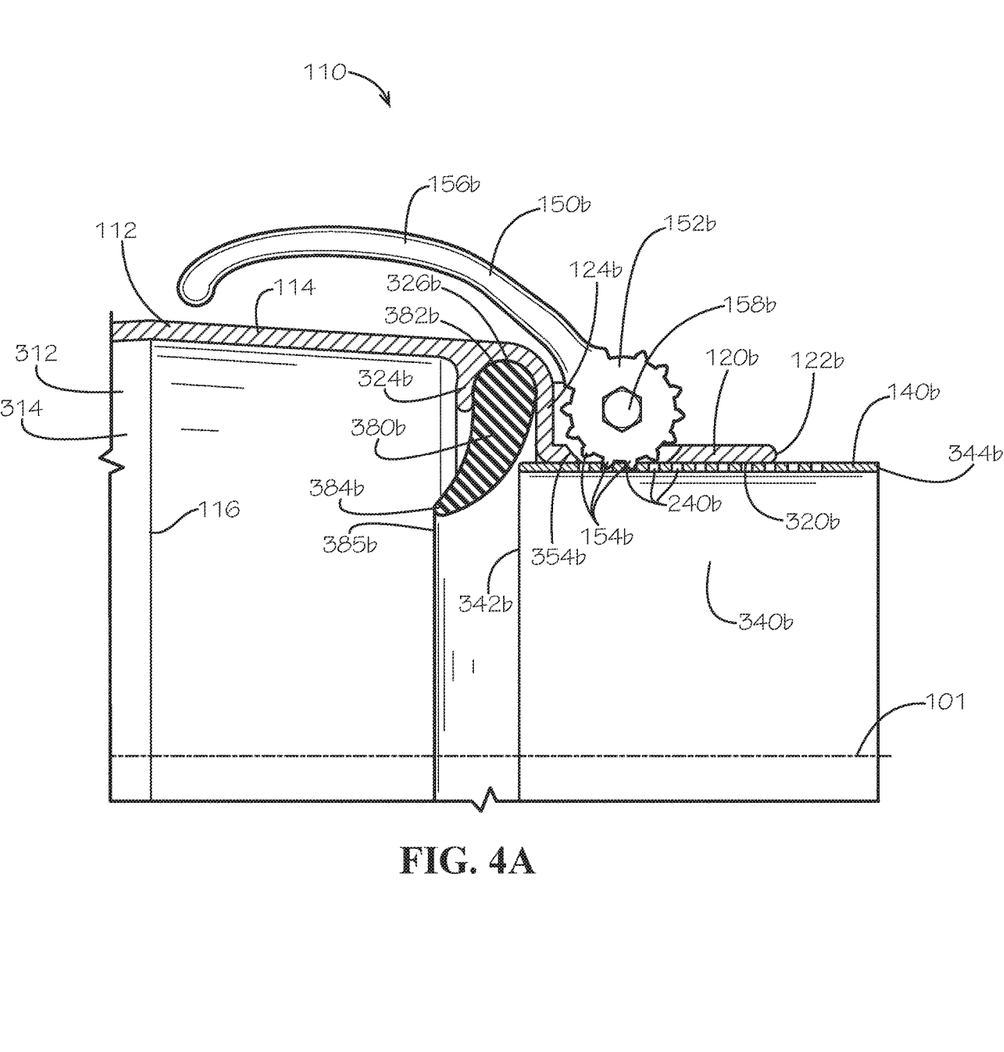
FIG. 4A is a detail cross-sectional view of the second sleeve actuator and the second sleeve of the wide-range coupling of FIG. 1 in the engaged position, taken from Detail 4 shown in FIG. 3.

FIG. 4A shows the sleeve actuator 150b and the sleeve 140b in the engaged position without a pipe length inserted into the wide-range coupling 110 through the sleeve bore 340b. In the present aspect, the first sleeve end 342b can extend through the neck bore portion 320b and into the center bore portion 314 in the engaged position. In other aspects, the first sleeve end 342b can be disposed within the neck bore portion 320b when the sleeve 140b is in the engaged position. With the sleeve 140b in the engaged position, the second sleeve end 344b can extend outwards from the neck bore portion 320b in the present aspect; however in other aspects, the second sleeve end 344b can be flush with the body end 122b or disposed within the neck bore portion 320b with the sleeve 140b in the engaged position.

The gasket 380b can be in a relaxed state when the sleeve actuator 150b and the sleeve 140b are in the engaged position and no pipe length is inserted through the sleeve 140b. In the present aspect, the radially inner lip 384b can extend radially and axially inward from the radially outer lip 382b in the relaxed state with respect to the axis 101. In other aspects, the radially inner lip 384b may only extend radially inward from the radially outer lip 382b in the relaxed state, and the gasket 380 can be oriented substantially perpendicular to the axis 101. The radially inner lip 384b can be positioned radially inward from the sleeve 140b when the sleeve 140b is in the engaged position.

Figure 4B:
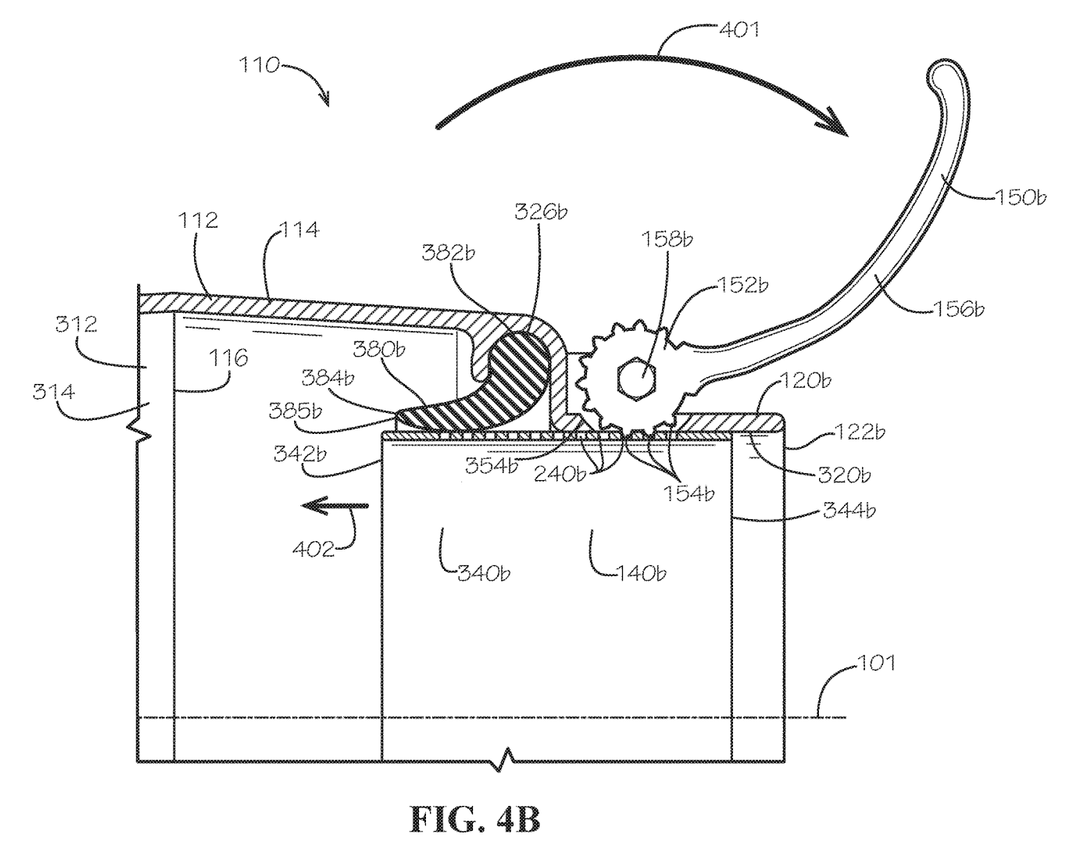
FIG. 4B is a detail cross-sectional view of the second sleeve actuator and the second sleeve of the wide-range coupling of FIG. 1 in a disengaged position, taken from Detail 4 shown in FIG. 3.

FIG. 4B shows the sleeve actuator 150b and the sleeve 140b in a disengaged position without a pipe length inserted into the wide-range coupling 110 through the sleeve bore 340b. The sleeve actuator 150b can be repositioned from the engaged position to the disengaged position by rotating the sleeve actuator 150b about the fastener 158b in a first direction 401. In the present aspect, rotating the sleeve actuator 150b in the first direction 401 can rotate the handle portion 156b away from the centerline 116 and towards the adjacent body end 122b.

When the sleeve actuator 150b is rotated in the first direction 401, mechanical engagement between the teeth 154b and the slots 240b through the gear port 354b can translate the sleeve 140b along the axis 101 to a disengaged position of the sleeve 140b, driving the sleeve 140b through the gasket opening 385b to widen the gasket opening 385b. In the present aspect, the sleeve 140b can be translated by the sleeve actuator 150b in an axially inward disengagement direction 402 towards the centerline 116, thereby repositioning the sleeve 140b from the engaged position to the disengaged position. In the disengaged position, the first sleeve end 342b can be positioned axially inward from the radially inner lip 384b, and the second sleeve 140b can be positioned radially inward from the radially inner lip 384b of the gasket 380b relative to the axis 101. The gasket 380b can be stretched around the sleeve 140b when the sleeve 140b is in the disengaged position. In the present aspect, the radially outer lip 382b and the gasket groove 326b can define complimentary curved profiles, and the radially outer lip 382b can roll within the gasket groove 326b. In other aspects, either or both of the radially outer lip 382b and the gasket groove 326b may not define the curved profiles, and the radially outer lip 382b can be prevented from rolling within the gasket groove 326b.

The gasket 380b can comprise a resilient, elastic material such as a rubber, elastomer, polymer, or other suitable material. When the sleeve 140b is driven through the gasket opening 385b of the gasket 380b in the disengagement direction 402, the radially inner lip 384b can deflect axially inward and stretch over and around the first sleeve end 342b of the second sleeve 140b. When the sleeve 140b is positioned in the disengaged position and the gasket 380b is disposed radially outward from the sleeve 140b with respect to the axis 101, the gasket 380b can be in a disengaged state. With the sleeve 140b in the disengaged position and the gasket 380b in the disengaged state, the sleeve bore 340b can be unobstructed and configured to receive a pipe length.

Figure 4C:
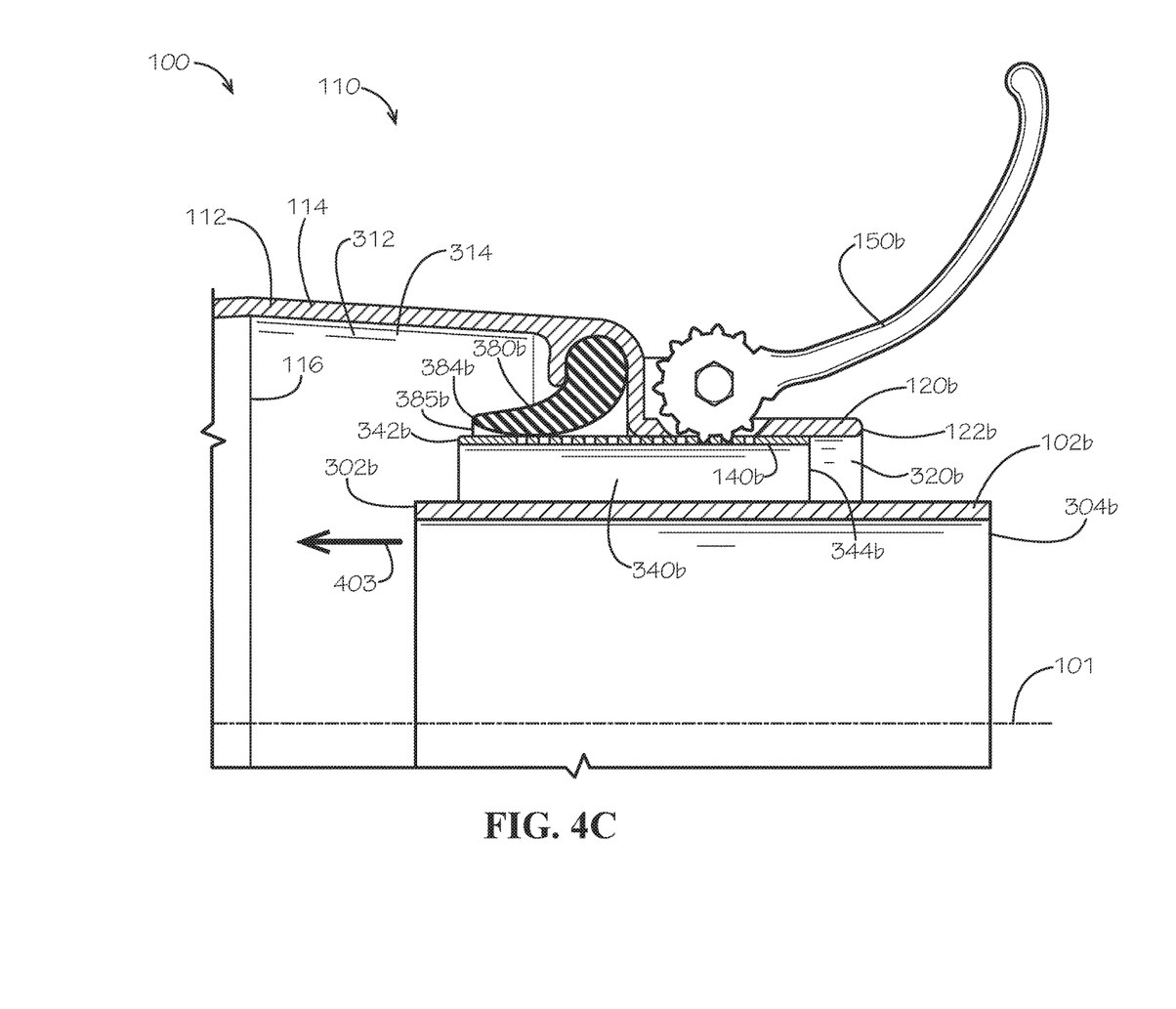
FIG. 4C is a detail cross-sectional view of the second sleeve actuator and the second sleeve of the wide-range coupling of FIG. 1 in a disengaged position with the second pipe length inserted into the wide-range coupling, taken from Detail 4 shown in FIG. 3.
Figure 5:
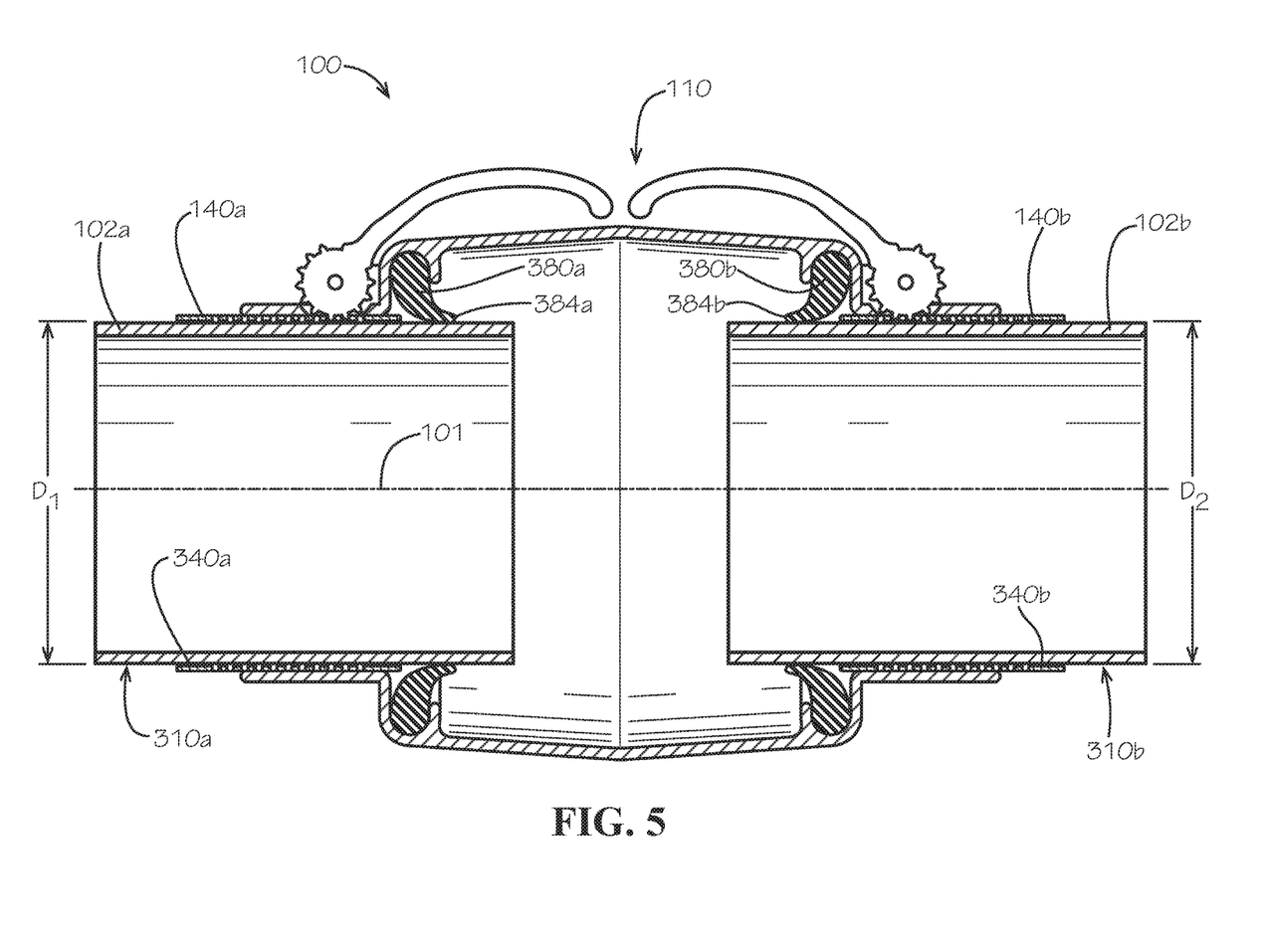
FIG. 5 is a cross sectional view of another aspect of the pipe connection assembly wherein the first pipe length and the second pipe length are sized at a maximum compatible pipe diameter in accordance with another aspect of the present disclosure.

FIG. 4C shows the first pipe end 302b of the pipe length 102b being inserted into the wide-range coupling 110 with the sleeve 140b and the sleeve actuator 150b in the disengaged position and the gasket 380b in the disengaged state. The first pipe end 302b can be inserted in an axially inward direction 403, which in the current aspect is the same as the disengagement direction 402, into the center bore portion 314 of the body bore 312 through the sleeve bore 340b of the sleeve 140b and through the neck bore portion 320b of the neck 120b. With the sleeve 140b in the disengaged position and the gasket in the disengaged state, the sleeve 140b is positioned between the pipe length 102b and the radially inner lip 384b of the gasket 380b, thereby preventing the gasket 380b from engaging the pipe length 102b. In the disengaged position, the pipe length 102b can be freely inserted and withdrawn from the wide-range coupling 110 with little or no resistance.

Figure 4D:
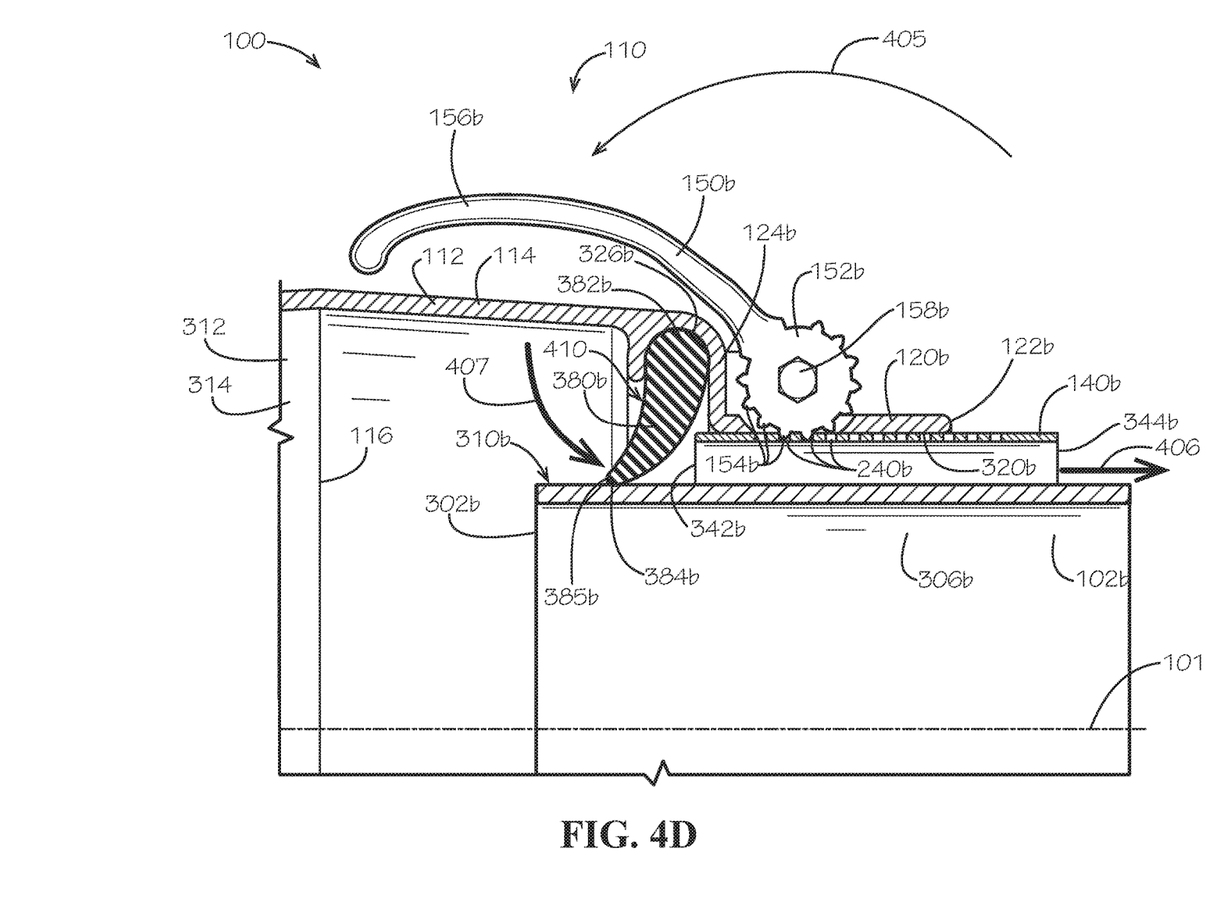
FIG. 4D is a detail cross-sectional view of the second sleeve actuator and the second sleeve of the wide-range coupling of FIG. 1 in the engaged position with a second gasket of the wide-range coupling forming a seal with the second pipe length, taken from Detail 4 shown in FIG. 3.

FIG. 4D shows the pipe length 102b sealed to the wide-range coupling 110 with the sleeve 140b and the sleeve actuator 150b in the engaged position. Rotating the sleeve actuator 150b about the fastener 158b in a second direction 405 can reposition the sleeve actuator 150b and the sleeve 140b from the disengaged position to the engaged position, thereby pulling the sleeve 140b out of the gasket opening 385b. The second direction 405 can be an opposite rotational direction from the first direction 401 shown in FIG. 4B. In the present aspect, rotating the sleeve actuator 150b in the second direction 405 can rotate the handle portion 156b away from the adjacent body end 122b and towards the centerline 116.

When the sleeve actuator 150b is rotated in the second direction 405, mechanical engagement between the teeth 154b and the slots 240b through the gear port 354b can translate the sleeve 140b back to the engaged position of the sleeve 140b. In the present aspect, the sleeve 140b can be translated by the sleeve actuator 150b in an axially outward engagement direction 406 along the axis 101 and away from the centerline 116, thereby repositioning the sleeve 140b from disengaged position to the engaged position. In the engaged position, the radially inner lip 384b of the gasket 380b can be positioned axially and radially inward from the first sleeve end 342b of the sleeve 140b relative to the axis 101. Translating the sleeve 140b in the engagement direction 406 can withdraw the first sleeve end 342b of the sleeve 140b through the gasket opening 385b.

With the sleeve 140b withdrawn from the gasket opening 385b, the radially inner lip 384b of the gasket 380b can constrict radially inward with respect to the axis 101 due to resiliency of the gasket 380b. In the present aspect, the radially inner lip 384b can also swing axially outward while constricting radially inward with respect to the axis 101, as shown by a directional arrow 407. The radially inner lip 384b can spring towards the relaxed state of the gasket 380b as shown in FIG. 4A; however, interference between the pipe length 102b and the gasket 380b can place the gasket 380b in a deformed state. The gasket opening 385b can be sized smaller than the pipe length 102b such that the radially inner lip 384b can exert a residual constricting force on the outer pipe surface 310b of the pipe length 102b in the deformed state. The residual constricting force can form a seal between the gasket 380b and the pipe length 102b.

Once the seal is formed between the gasket 380b and the pipe length 102b, the pipe bore 306b can be sealed in fluid communication with the center bore portion 314 of the body bore 312. In pressurized fluid service, a fluid can exert pressure on an axially inner face 410 of the gasket 380b. The axially inner face 410 can face the center bore portion 314 of the body bore 312. Pressure acting on the axially inner face 410 proximate to the radially inner lip 384b can deform the radially inner lip 384b radially inward and axially outward with respect to the axis 101, thereby further energizing and strengthening the seal formed between the radially inner lip 384b and the pipe length 102. As the gasket 380b deforms towards a more vertical orientation, the gasket 380b can additionally be axially compressed between the outer pipe surface 310b and the gasket groove 326b, thereby energizing a seal formed between the radially outer lip 382b and the gasket groove 326b. Pressure acting on the axially inner face 410 proximate to the radially outer lip 382b can also press the radially outer lip 382b against the shoulder 124b to additionally seal the radially outer lip 382b with the shoulder 124b and ensure isolation of the neck bore portion 320 from the center bore portion 314.

In order to break the seal and release the pipe length 102b from the wide-range coupling 110, the sleeve actuator 150b can be rotated in the first direction 401 (shown in FIG. 4B) to drive the first sleeve end 342b in the disengagement direction 402 (shown in FIG. 4B) through the gasket opening 385b and between the gasket 380b and the pipe length 102b. With the sleeve 140b positioned between the gasket 380b and the pipe length 102b, the seal can be broken, and the pipe length 102b can be withdrawn axially outward with respect to the axis 101 and parallel to the engagement direction 406 to remove the pipe length 102b from the wide-range coupling 110.

As previously described, the pipe length 102b can be sized at a minimum compatible pipe diameter in FIGS. 1-3, 4C, and 4D. The minimum compatible pipe diameter of the pipe length 102b can be slightly larger than a diameter of the gasket opening 385b measured in the relaxed state of the gasket 380b, as shown in FIG. 4D. By sizing the gasket opening 385b slightly smaller than the minimum compatible pipe diameter, the radially inner lip 384b exerts the residual constricting force on the outer pipe surface 310b which can form the seal between the gasket 380b and the pipe length 102*b* in unpressurized conditions. Exerting pressure on the gasket 380*b* can further energize and strengthen the seal as described above.

FIG. 5 is a cross-sectional view of another aspect of the pipe connection assembly 100 wherein the pipe lengths 102*a,b* are sized at a maximum compatible pipe diameter. The maximum compatible pipe diameter can be limited by a diameter of the sleeve bores 340*a,b*. In the present aspect, the pipe lengths 102*a,b* can be respectively sized to provide minimal clearance between the outer pipe surfaces 310*a,b* and the sleeve bores 340*a,b* of the respective sleeves 140*a,b*. With the pipe lengths 102*a,b* sized to the maximum compatible pipe diameter, the radially inner lip 384*a,b* of each respective gasket 380*a,b* can be stretched radially outward with respect to the axis 101 to a greater degree than when the pipe lengths 102*a,b* are sized to the minimum compatible pipe diameter as shown in FIGS. 3 and 4D.

In some aspects, the pipe connection assembly 100 can connect pipe lengths 102*a,b* of dissimilar diameters, and the first outer pipe diameter $D_1$ can be larger or smaller than the second outer pipe diameter $D_2$. The compatible range of pipe diameters for each wide-range coupling 110 can allow the wide-range coupling 110 to connect to coated pipes, out-of-round pipes, or pipes manufactured to different industry standards. For example, an aspect of the wide-range coupling 110 sized as a 6" nominal wide-range coupling can connect with both a 6" nominal pipe manufactured to American Society of Mechanical Engineers ("ASME") standards which measures 168.3 mm in diameter as well as a 6" nominal pipe manufactured to Japanese Industrial Standards ("JIS") which measures 165.2 mm in diameter. Alternatively, the 6" nominal wide-range coupling can connect to 6" nominal pipes comprised of a variety of different materials, such as steel, stainless steel, cast iron, ductile iron, acrylonitrile butadiene styrene, copper, concrete, polyvinyl chloride, glass-reinforced plastic, or any other suitable material, each of which may define a slightly different outer diameter at the 6" nominal pipe size. By maintaining compatibility with pipes of different standards or different materials, inventories can be simplified with the wide-range coupling 110.

In other aspects, the wide-range coupling 110 can be compatible with a range of nominal pipe sizes. For example and without limitation, a 2½" nominal wide-range coupling can be compatible with 2½" nominal pipes as well as a 2" and/or 3" nominal pipes. In some aspects, the wide-range coupling 110 can have a compatible diameter range of 2" or larger. For example and without limitation, a 10" nominal wide-range coupling can be compatible with an 8" nominal pipe size in some aspects.

Figure 6:
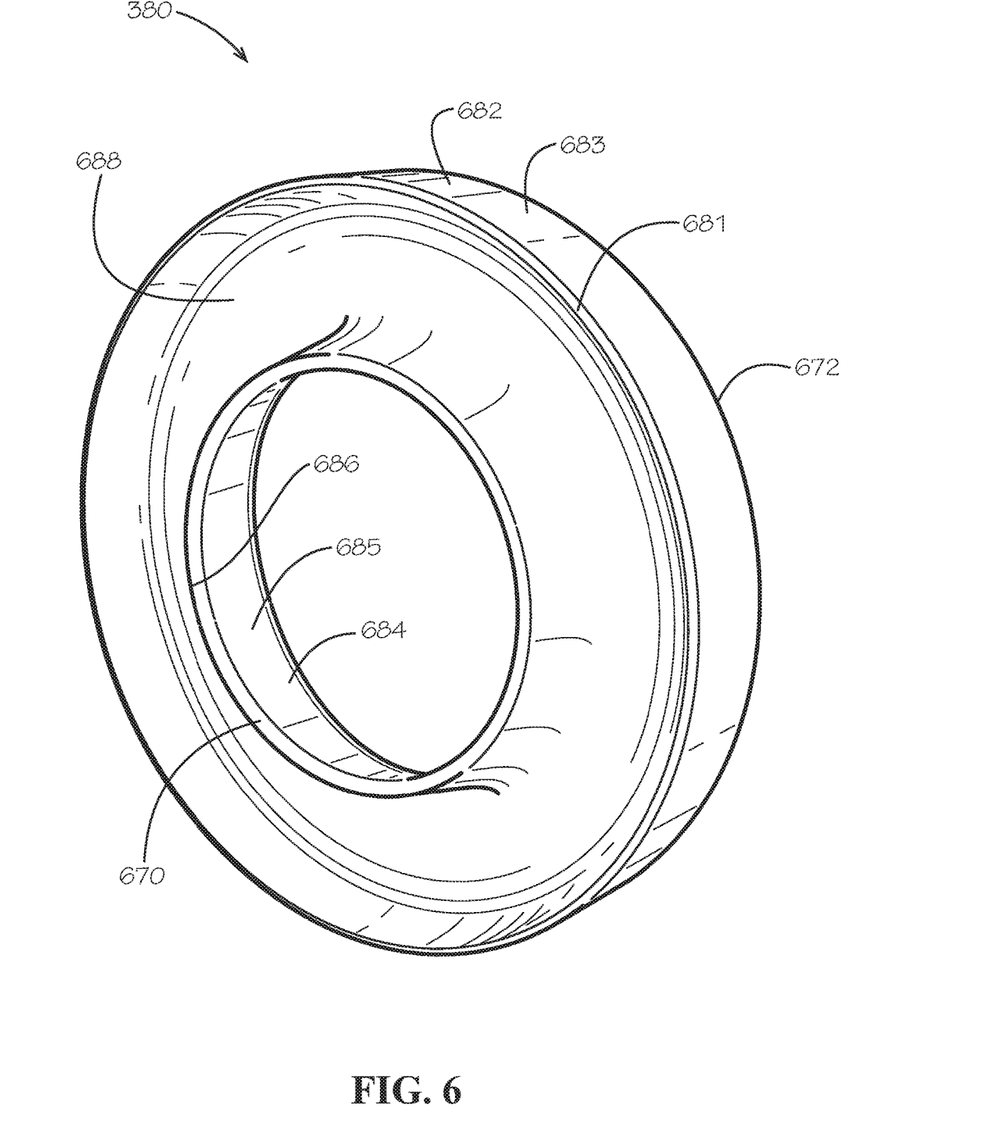
FIG. 6 is a perspective view of another aspect of the gasket in accordance with another aspect of the present disclosure.

FIG. 6 is a perspective view of another aspect of a gasket 380 in accordance with another aspect of the present disclosure. The gasket 380 is shown in a relaxed state. In place of the radially outer lips 382*a,b* (shown in FIG. 3) and the radially inner lips 384*a,b* (shown in FIG. 3) of the gaskets 380*a,b* (shown in FIG. 3), the gasket 380 can instead define a radially outer rim 682 and a radially inner rim 684, respectively. The gasket 380 can define an first axial end 670 and a second axial end 672. When installed within the body 112 of the wide-range coupling 110, the first axial end 670 can face the centerline 116 (shown in FIG. 3), and the second axial end 672 can face the adjacent neck 120*a,b* (shown in FIG. 3).

In the present aspect, the first axial end 670 can be defined by an inner rim edge 686 of the radially inner rim 684. The radially outer rim 682 can define an outer rim edge 681 disposed between the first axial end 670 and the second axial end 672. In other aspects, the outer rim edge 681 can be positioned axially even with the inner rim edge 686 at the first axial end 670 of the gasket 380. The radially outer rim 682 can define an outer sealing surface 683, and the radially inner rim 684 can define an inner sealing surface 685. The outer sealing surface 683 can be configured to seal against the body 112 (shown in FIG. 1) within the body bore 312 (shown in FIG. 3). The inner sealing surface 685 can be configured to seal against the respective outer pipe surface 310*a,b* (shown in FIG. 3) of a one of the pipe lengths 102*a,b* (shown in FIG. 3).

In the present aspect the outer sealing surface 683 can define a substantially frustoconical shape; however, once the gasket 380 is installed within the body bore 312, the radially outer rim 682 can be deformed so that the outer sealing surface 683 can define a cylindrical shape. The inner sealing surface 685 can define a parabolic funnel shape; however in other aspects, the inner sealing surface 685 can define a different shape, such as a frustoconical shape or any other suitable shape.

An annular groove 688 can be defined between the radially outer rim 682 and the radially inner rim 684. The annular groove 688 can extend into the gasket 380 from the first axial end 670 towards the second axial end 672. In the present aspect, the gasket 380 can define a J-shaped cross section wherein the radially outer rim 682 defines the short, straight leg of the "J", the radially inner rim 684 defines the long, straight leg of the "J", and the annular groove 688 defines the curved portion of the "J". In other aspects in which the outer rim edge 681 can be positioned even with the inner rim edge 686 at the first axial end 670 of the gasket 380, the gasket 380 can define a U-shaped cross section where the radially outer rim 682 and the radially inner rim 684 can define the straight legs of the "U", and the annular groove 688 can define the curved portion of the "U".

The annular groove 688 can increase sealing strength of the gasket 380. When exposed to pressurized fluids, the annular groove 688 causes a force from the pressurized fluids to act substantially radially outward on the radially outer rim 682, thereby pressing the outer sealing surface 683 against the body 112 to form a stronger seal within the body bore 312. The force can also act substantially radially inward on the radially inner rim 684, thereby pressing the inner sealing surface 685 against the respective outer pipe surface 310*a,b* to form a stronger seal with the adjacent pipe lengths 102*a,b*. Increasing fluid pressure can further energize the gasket 380 and strengthen the seals, thereby preventing leakage under high pressure.

Figure 7A:
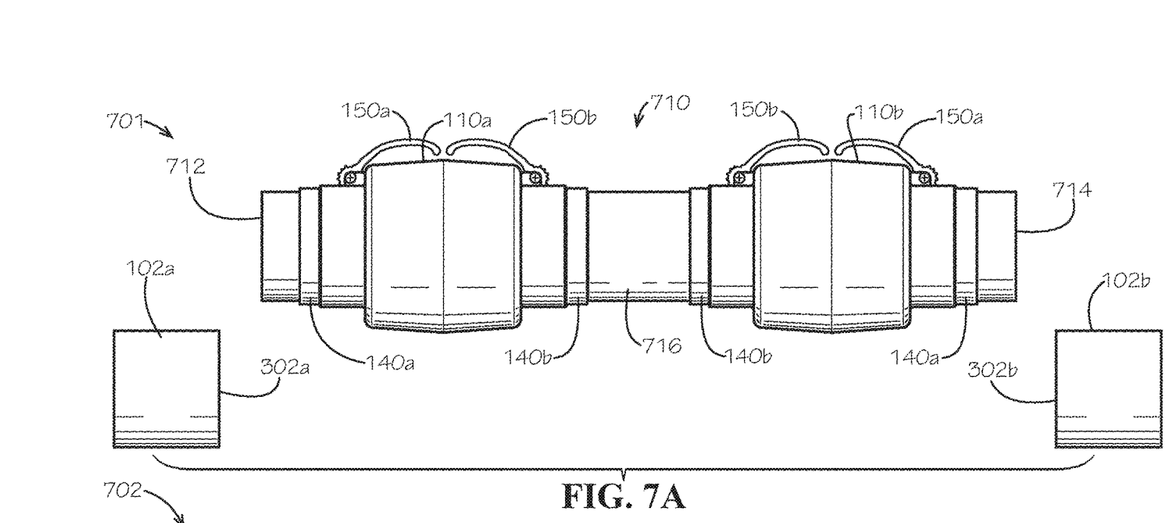
FIG. 7A is a side view of a first step of a method for installing a tie-in pipe spool between two pipe lengths in accordance with one aspect of the present disclosure.

FIGS. 7A-D show sides views demonstrating an installation sequence of a tie-in pipe spool 710 between two pipe lengths 102*a,b*. FIG. 7A shows a first step 701 wherein the tie-in pipe spool 710 can be aligned between the first pipe end 302*a* of the first pipe length 102*a* and the first pipe end 302*b* of the second pipe length 102*b*. The pipe lengths 102*a,b* can be attached to different portions of a pipeline (not shown), such as a water distribution line. The tie-in pipe spool 710 can be configured to join the two pipe lengths 102*a,b* together, such as at the completion of construction for the pipeline or during repair of the pipeline. For example, a damaged portion of the pipeline could be cut out between the two pipe lengths 102*a,b*, and the tie-in pipe spool 710 can be installed between the two pipe lengths 102*a,b* to repair the pipeline.

The tie-in pipe spool 710 can comprise a tie-in pipe length 716. The tie-in pipe length 716 can define a first end 712 and a second end 714 disposed opposite from the first end 712. The tie-in pipe spool 710 can comprise a pair of wide-range couplings 110a,b which can be positioned on the tie-in pipe length 716 between the first end 712 and the second end 714. The tie-in pipe spool 710 can be provided with the sleeves 140a,b and the sleeve actuators 150a,b in the engaged position to secure the wide-range couplings 110a,b on the tie-in pipe length 716, such as during transport, handling, and alignment of the tie-in pipe spool 710 with the pipe lengths 102a,b. In other aspects, the tie-in pipe spool 710 can be lowered into place with the sleeves 140a,b and the sleeve actuators 150a,b in the disengaged position.

Figure 7B:
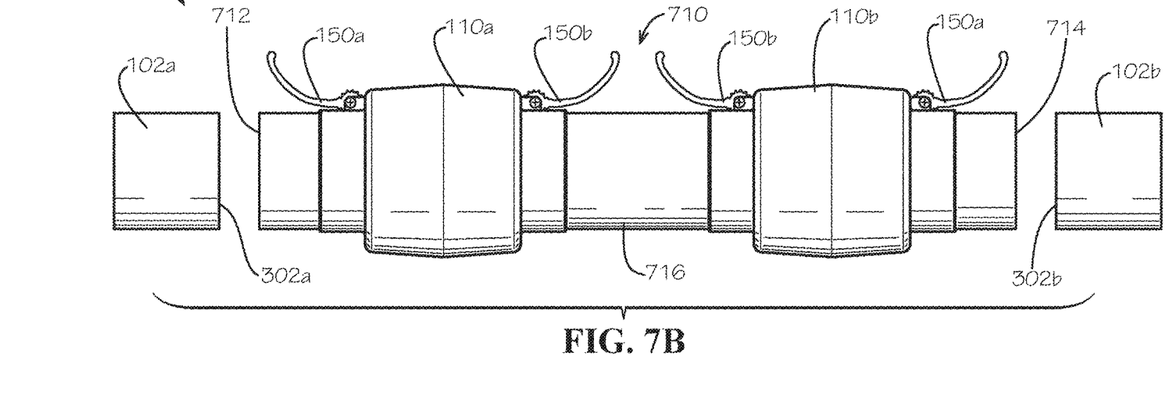
FIG. 7B is a side view of a second step of the method for installing the tie-in pipe spool of FIG. 7A between the two pipe lengths of FIG. 7A.

FIG. 7B shows a second step 702 wherein the tie-in pipe spool 710 can be lowered between the pipe lengths 102a,b. The tie-in pipe length 716 can be positioned coaxial to the pipe lengths 102a,b. Once the tie-in pipe spool 710 is lowered and aligned between the pipe lengths 102a,b, the sleeves 140a,b and the sleeve actuators 150a,b can be repositioned to the disengaged position so that the wide-range couplings 110a,b can freely slide along the tie-in pipe length 710.

Figure 7C:
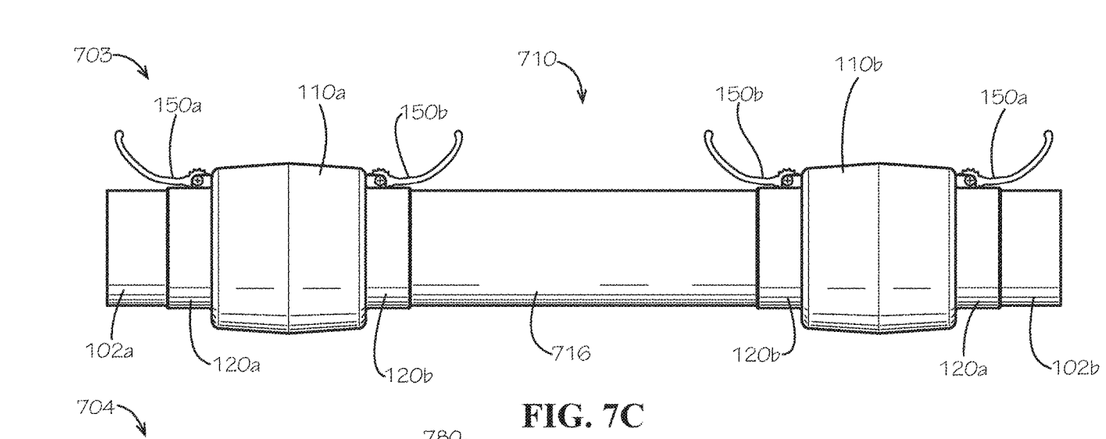
FIG. 7C is a side view of a third step of the method for installing the tie-in pipe spool of FIG. 7A between the two pipe lengths of FIG. 7A.

FIG. 7C shows a third step 703 wherein the wide-range couplings 110a,b can be positioned to bridge between the tie-in pipe length 716 and the pipe lengths 102a,b. With the tie-in pipe spool 710 lowered between the pipe lengths 102a,b and aligned between the first pipe ends 302a,b, the wide-range coupling 110a can be slipped over the first pipe end 302a (shown in FIG. 7A) and onto the first pipe length 102a. The first pipe end 302a of the first pipe length 102a can be received by the first neck 120a of the wide-range coupling 110a, and the first end 712 (shown in FIG. 7A) of the tie-in pipe spool 710 can extend through the second neck 120b of the wide-range coupling 110a. Similarly, the wide-range coupling 110b can be slipped over the first pipe end 302b (shown in FIG. 7A) and onto the second pipe length 102b. The first pipe end 302b of the second pipe length 102b can be received by the first neck 120a of the wide-range coupling 110b, and the second end 714 (shown in FIG. 7A) of the tie-in pipe spool 710 can extend through the second neck 120b of the wide-range coupling 110b.

Figure 7D:
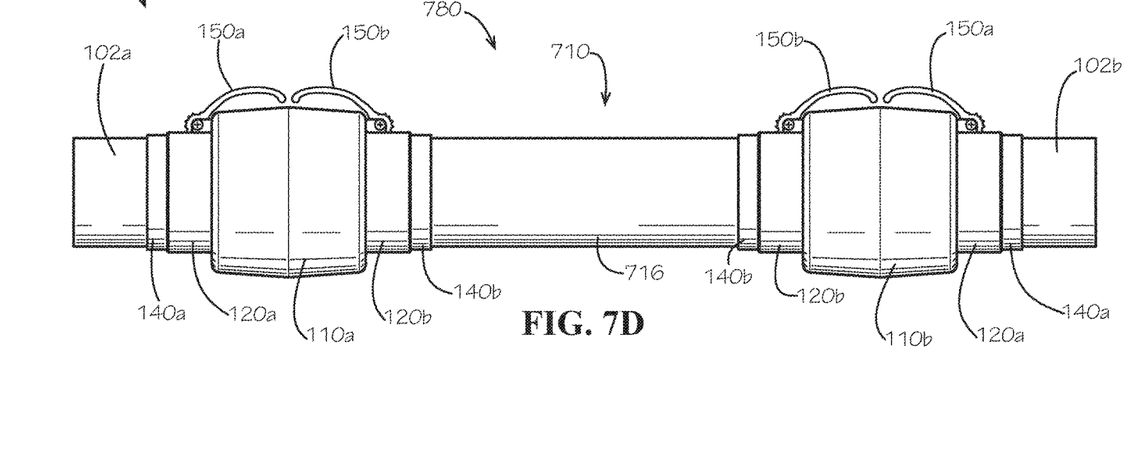
FIG. 7D is a side view of a fourth step for the method of installing the tie-in pipe spool of FIG. 7A between the two pipe lengths of FIG. 7A.

FIG. 7D shows a fourth step 704 wherein the sleeve actuators 150a,b for each respective wide-range coupling 110a,b can be actuated to seal the tie-in pipe length 716 to the pipe lengths 102a,b, thereby completing the pipeline 780. As shown, the sleeves 140a,b and the sleeve actuators 150a,b for each wide-range coupling 110a,b can be in the engaged position which allows gaskets 380a,b (shown in FIG. 3) of each of the wide-range couplings 110a,b to seal with the respective pipe lengths 102a,b and the tie-in pipe length 716 as shown and described with respect to FIG. 4D.

One should note that conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more particular embodiments or that one or more particular embodiments necessarily include logic for deciding, with or without user input or prompting, whether these features, elements and/or steps are included or are to be performed in any particular embodiment.

It should be emphasized that the above-described embodiments are merely possible examples of implementations, merely set forth for a clear understanding of the principles of the present disclosure. Any process descriptions or blocks in flow diagrams should be understood as representing modules, segments, or portions of code which include one or more executable instructions for implementing specific logical functions or steps in the process, and alternate implementations are included in which functions may not be included or executed at all, may be executed out of order from that shown or discussed, including substantially concurrently or in reverse order, depending on the functionality involved, as would be understood by those reasonably skilled in the art of the present disclosure. Many variations and modifications may be made to the above-described embodiment(s) without departing substantially from the spirit and principles of the present disclosure. Further, the scope of the present disclosure is intended to cover any and all combinations and sub-combinations of all elements, features, and aspects discussed above. All such modifications and variations are intended to be included herein within the scope of the present disclosure, and all possible claims to individual aspects or combinations of elements or steps are intended to be supported by the present disclosure.

That which is claimed is:

1. A wide-range coupling comprising:
   a body, the body defining a first body end and a second body end, a body bore defined extending through the body from the first body end to the second body end, the body bore defining an axis;
   a gasket positioned within the body bore;
   a sleeve positioned at least partially within the body bore proximate to the first body end; and
   a sleeve actuator attached to the body, the sleeve actuator mechanically engaging the sleeve, the sleeve actuator configured to axially translate the sleeve relative to the axis of the body bore about and between a disengaged position and an engaged position; and
   wherein:
   the gasket defines a radially inner lip relative to the axis of the body bore;
   the radially inner lip is positioned radially inward from the sleeve relative to the axis of the body bore when the sleeve is in the engaged position; and
   the radially inner lip is positioned radially outward from the sleeve relative to the axis of the body bore when the sleeve is in the disengaged position.

2. The wide-range coupling of claim 1, wherein:
   the sleeve defines an axially inner end and an axially outer end relative to the axis of the body bore;
   the axially inner end is positioned axially outward from the radially inner lip relative to the axis of the body bore when the sleeve is in the engaged position; and
   the axially inner end is positioned axially inward from the radially inner lip relative to the axis of the body bore when the sleeve is in the disengaged position.

3. The wide-range coupling of claim 1, wherein the gasket is stretched around the sleeve when the sleeve is in the disengaged position.

4. The wide-range coupling of claim 1, wherein:
   the sleeve defines a plurality of slots in an axial arrangement;
   the sleeve actuator defines a plurality of teeth; and
   a first tooth of the plurality of teeth engages a first slot of the plurality of slots.

5. The wide-range coupling of claim 4, wherein:
   the sleeve actuator defines a gear portion;
   the gear portion is rotatable relative to the body; and
   the gear portion defines the plurality of teeth.

6. The wide-range coupling of claim 1, wherein:
   the gasket is seated in a gasket groove defined within the body bore;

the body bore defines a neck portion extending between the first body end and the gasket groove;

the sleeve defines an inner sleeve surface and an outer sleeve surface; and the outer sleeve surface is in facing engagement with the neck portion of the body bore.

7. A method of connecting a pipe length to a wide-range coupling, the method comprising:

inserting a first pipe end of the pipe length into a body bore defined by a body through a sleeve bore defined by a sleeve, the wide-range coupling comprising the sleeve and the body, the sleeve positioned at least partially in the body bore, the body bore defining an axis, an end of the sleeve extending through a gasket opening defined by a gasket of the wide-range coupling;

axially translating the sleeve along the axis in an engagement direction relative to the body to withdraw the sleeve from the gasket opening;

engaging the gasket with an outer pipe surface of the pipe length to form a seal; and axially translating the end of the sleeve through the gasket opening in a disengagement direction along the axis and breaking the seal between the outer pipe surface and the gasket, wherein:

the disengagement direction is opposite from the engagement direction; and axially translating an end of the sleeve through the gasket opening comprises stretching a radially inner lip of the gasket over the end of the sleeve.

8. The method of claim 7, further comprising rotating a sleeve actuator to translate the sleeve along the axis of the body bore relative to the body, the sleeve actuator mechanically engaging the sleeve, the sleeve actuator attached to the body.

9. The method of claim 8, engaging a tooth of the sleeve actuator with a slot of the sleeve.

10. A wide-range coupling comprising:

a body, the body defining a first body end and a second body end, a body bore defined extending through the body from the first body end to the second body end, the body bore defining an axis;

a gasket positioned within the body bore; and wherein:

the sleeve defines a plurality of slots in an axial arrangement;

the sleeve actuator defines a plurality of teeth; and a first tooth of the plurality of teeth engages a first slot of the plurality of slots;

a sleeve positioned at least partially within the body bore proximate to the first body end; and a sleeve actuator attached to the body, the sleeve actuator mechanically engaging the sleeve, the sleeve actuator configured to axially translate the sleeve relative to the axis of the body bore about and between a disengaged position and an engaged position.

11. The wide-range coupling of claim 10, wherein:

the sleeve actuator defines a gear portion;

the gear portion is rotatable relative to the body; and the gear portion defines the plurality of teeth.

12. The wide-range coupling of claim 10, wherein:

the gasket is seated in a gasket groove defined within the body bore;

the body bore defines a neck portion extending between the first body end and the gasket groove;

the sleeve defines an inner sleeve surface and an outer sleeve surface; and the outer sleeve surface is in facing engagement with the neck portion of the body bore.

13. The wide-range coupling of claim 10, wherein the gasket is stretched around the sleeve when the sleeve is in the disengaged position.

14. The wide-range coupling of claim 10, wherein:

the gasket defines a radially inner lip relative to the axis of the body bore;

the radially inner lip is positioned radially inward from the sleeve relative to the axis of the body bore when the sleeve is in the engaged position;

the radially inner lip is positioned radially outward from the sleeve relative to the axis of the body bore when the sleeve is in the disengaged position;

the sleeve defines an axially inner end and an axially outer end relative to the axis of the body bore;

the axially inner end is positioned axially outward from the radially inner lip relative to the axis of the body bore when the sleeve is in the engaged position; and the axially inner end is positioned axially inward from the radially inner lip relative to the axis of the body bore when the sleeve is in the disengaged position.

* * * * *